Feb. 28, 1950 A. G. HARMON 2,499,245
WIRE LAYING MACHINE
Filed April 20, 1948 2 Sheets-Sheet 1
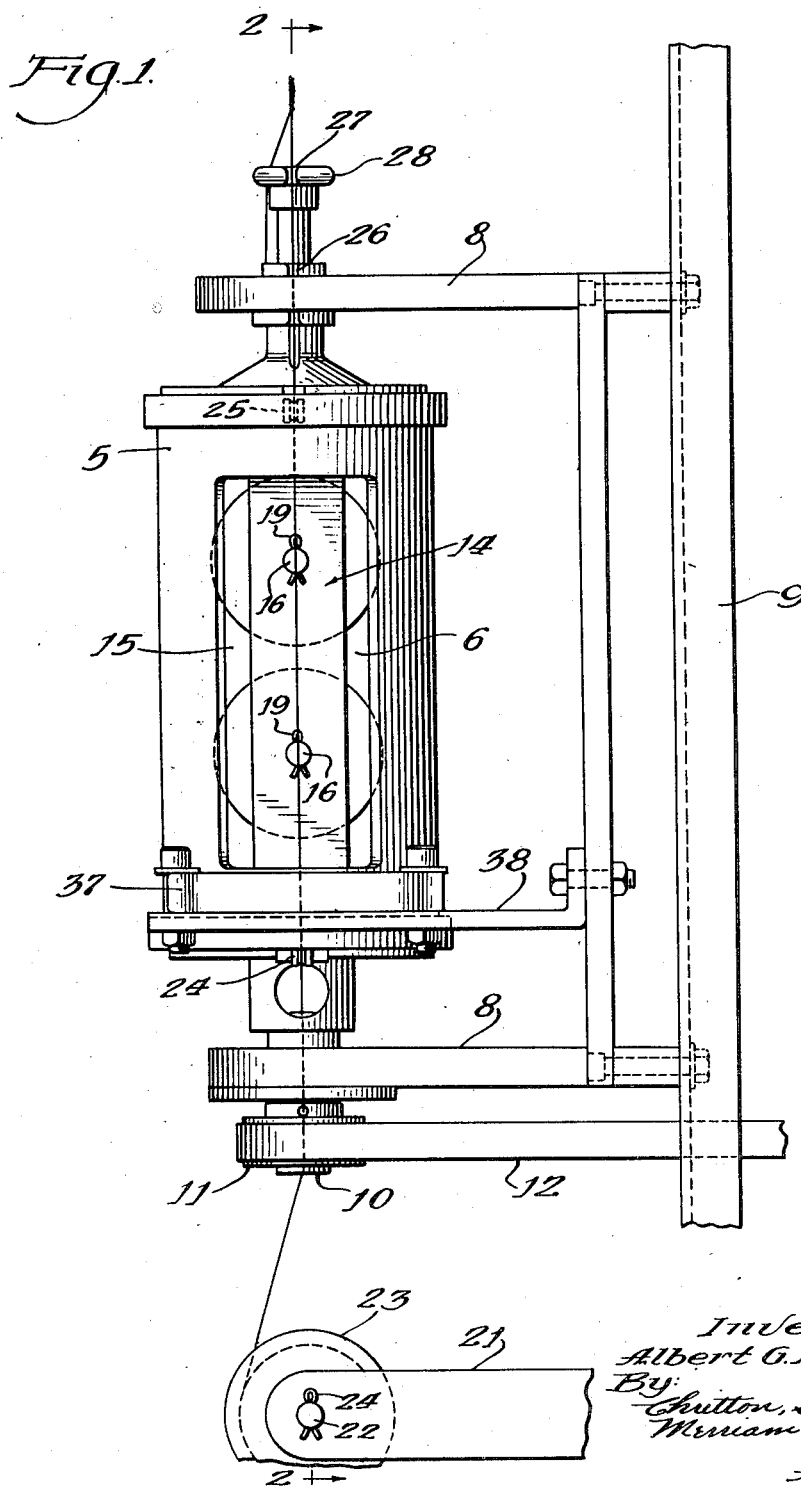
Inventor:
Albert G. Harmon
By Hutton, Schroeder,
Merriam & Hofgren
Attorneys

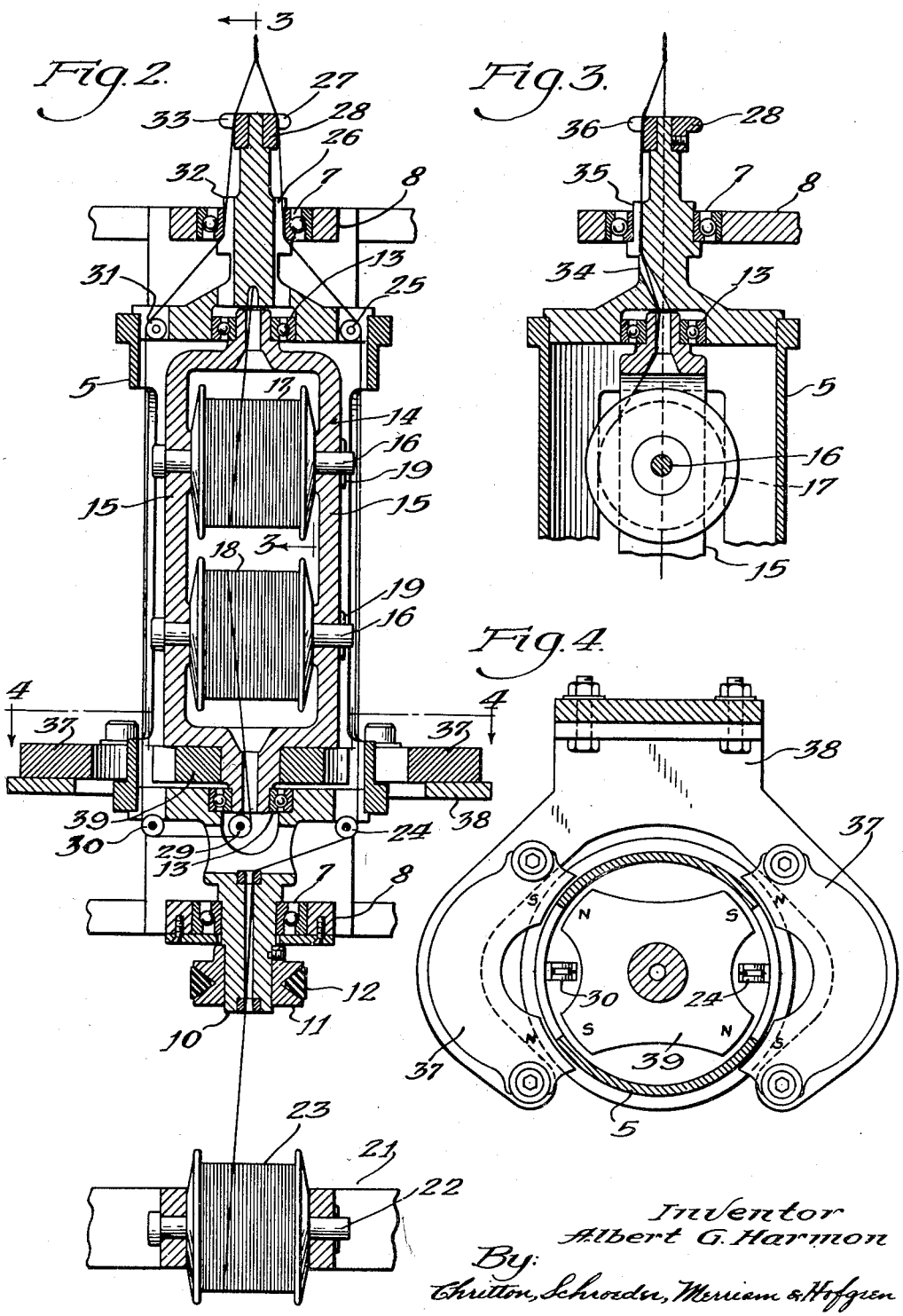

Patented Feb. 28, 1950

2,499,245

UNITED STATES PATENT OFFICE 2,499,245

WIRE LAYING MACHINE

Albert G. Harmon, South Bend, Ind., assignor to National-Standard Company, Niles, Mich., a corporation of Michigan Application April 20, 1948, Serial No. 22,072

3 Claims. (Cl. 57—59)

This invention relates to wire laying machines, and more particularly to the "skip" type of machine in which the wires are laid together to form a strand without being twisted individually.

The primary object of the present invention is to provide a skip type wire laying machine in which a single cradle carries a plurality of spools of wire.

A further object is to provide a machine which is vertically disposed, and thus occupies small floor space.

The invention is illustrated in a preferred embodiment in the accompanying drawings in which Fig. 1 is an elevational view of the improved wire laying machine; Fig. 2 is a section taken as indicated at 2—2 of Fig. 1; Fig. 3 is a section taken as indicated at 3—3 of Fig. 2; and Fig. 4 is a section taken as indicated at 4—4 of Fig. 2.

Referring to the drawings in greater detail, a rotor 5, made of brass or other non-magnetic material, has large hand openings 6 to permit access to the spools. The rotor is anti-frictionally journaled in thrust bearings 7 secured to brackets 8 which are bolted to a main supporting frame 9. As best seen in Fig. 2, the rotor is provided with a hollow lower shaft 10 having a pulley 11 driven by means of a belt 12 connected to a motor (not shown).

As seen in Fig. 2, the rotor is provided at each end with anti-friction bearings 13 which accommodate a spool cradle 14 so that the rotor 5 may rotate about cradle 14. The cradle has side members 15 with openings to accommodate shafts 16 on which spools of wire 17 and 18 are journaled. Cotter pins 19 are used to hold the shafts 16 removably in the cradle.

A tail spool support 21 is apertured to receive a shaft 22 on which a tail spool 23 is mounted, the shaft 22 being removably retained in the mounting by means of a cotter pin 24. As shown, the tail spool support is adjacent the hollow shaft 10 of the rotor, and substantially in alignment therewith.

Wire guiding elements are associated with the rotor 5 in order to guide wires from the spools 17 and 18 and 23 to a forming head (not shown). Thus, the wire from the tail spool 23 passes through the hollow shaft 10 of the rotor and is guided over pulleys 24 and 25 which direct it between the cradle and the wall of the rotor. From the pulley 25, the tail spool wire passes through a passage 26 in the periphery of the upper portion of the rotor and through an exterior guide groove 27 in a take-off guide 28 which is secured to the end of the upper rotor shaft adjacent the forming head.

Wire from the lower spool 18 in the cradle passes downwardly through the hollow bottom spindle of the cradle, and is guided by pulleys 29, 30 and 31 around the lower end of the cradle and upwardly between the cradle and the wall of the rotor, in a line remote from that taken by the wire from the tail spool 23. From the pulley 31 the lower spool wire passes through a passage 32 in the periphery of the upper portion of the rotor, through a guide groove 33 in the take-off guide 28, and thus to the forming head.

As best seen in Fig. 3, wire from the upper spool 17 in the cradle passes upwardly through the hollow top spindle of the cradle, and through an angularly disposed guide passage 34 in the upper rotor spindle to the external surface thereof, thence through a passage 35 in the periphery of the upper portion of the rotor and a guide groove 36 in the take-off guide 28 to the forming head.

For clarity of illustration the passage 26 and guide groove 27, and the passage 32 and guide groove 33 are shown as being directly opposite each other, with the passage 35 and guide groove 36 midway therebetween. It is plain that for purposes of balancing the rotor 5, it will ordinarily be constructed with the passages 26, 32 and 35 equally spaced (120° apart), and the guide grooves 27, 33 and 36 of the take-off guide 28 will likewise be equidistant from one another.

As best seen in Figs. 2 and 4, magnets are used to prevent the cradle 14 from rotating with the rotor 5. Horse shoe magnets 37 are secured to a mounting bracket 38 on opposite sides of the lower end of the rotor; and a double magnetic element 39 is secured to the lower end of the cradle 14, surrounding the hollow bottom spindle thereof. As seen in Fig. 4, the double magnetic member 39 is so constructed that its poles are directly opposite the poles of the horse shoe magnet 37 so that the magnetic attraction may retain the cradle in a fixed position when the rotor is driven during a wire laying operation.

The foregoing detailed description is given for clearness of understanding only and no unnecessary limitations should be understood therefrom, for some modifications will be obvious to those skilled in the art.

I claim:

1. In a skip-type wire laying machine, a hollow rotor adapted to be driven at high speed; a spool cradle antifrictionally journalled in said rotor, said cradle being arranged to receive a plurality of spools of wire; wire guiding elements associated with said rotor to guide one wire from one spool through the bearing at one end of said cradle to a forming head, and another wire from another spool through the opposite bearing of the cradle and around said cradle to said forming head; and magnetic means to prevent rotation of the cradle with the rotor.

2. In a skip-type wire laying machine, a hollow rotor adapted to be driven at high speed, said rotor having one hollow spindle; a spool cradle antifrictionally journalled in said rotor, said cradle being arranged to receive two spools of wire; a tail-spool support; wire guiding elements associated with said rotor to guide one wire from one spool through the bearing at one end of said cradle to a forming head, a second wire from another spool through the opposite bearing of the cradle and around said cradle to said forming head, and a third wire from a tail spool through said hollow spindle and around the cradle to said forming head; and magnetic means to prevent rotation of the cradle with the rotor.

3. In a skip-type wire-laying machine, a vertically disposed hollow rotor having a hollow spindle, said rotor being supported in antifriction bearings at each of its ends; a spool cradle antifrictionally journalled in the rotor, said cradle having hollow journals; means in said cradle for rotatably supporting two spools of wire in tandem relation with their axes of rotation horizontal; a tail spool support in line with the rotor and adjacent the hollow spindle thereof; a system of wire guiding elements to guide wire from a spool in said cradle through one of said hollow journals to a forming head; a second system of wire guiding elements to guide wire from another spool through the opposite hollow journal and in a path around said cradle to said forming head; a third system of wire guiding elements to guide wire from a tail spool through said hollow spindle and around said cradle in a path remote from that traversed by wire guided by said second system; and magnetic means to prevent rotation of the cradle with the rotor.

ALBERT. G. HARMON.

REFERENCES CITED

The following references are of record in the file of this patent:

UNITED STATES PATENTS

| Number | Name | Date |
|---|---|---|
| 407,522 | Furst | July 23, 1889 |
| 555,146 | Barrett | Feb. 25, 1896 |
| 1,784,105 | Nigro et al. | Dec. 9, 1930 |
| 2,442,775 | Nelson | June 8, 1948 |